Patented Mar. 4, 1952

2,588,194

UNITED STATES PATENT OFFICE 2,588,194

SYNTHETIC LUBRICANT

Erving Arundale, Westfield, and John P. Thorn, Cranford, N. J., assignors to Standard Oil Development Company, a corporation of Delaware No Drawing. Application December 22, 1950, Serial No. 202,438

2 Claims. (Cl. 260—485)

This invention relates to a new chemical compound which has been found to be particularly suitable for use as a synthetic lubricant.

Recently, in an effort to obtain superior lubricants endowed with specific and superior characteristics, a new field has been explored, namely, the synthesis of lubricants from various organic chemical materials. Esters represent one class of materials which have attracted unusual interest as synthetic lubricants. In general, they are characterized by higher viscosity indices and lower pour points than mineral oils of corresponding viscosity. The compound described in the present specification is an ester which has been found to possess a very high viscosity, high viscosity index, and a low pour point. A lubricant which possesses such properties is of special value in the lubrication of engines which are subjected to high temperatures, such as combustion turbine engines, particularly those of the "prop-jet" type. Mineral oil lubricants containing added viscosity index improvers, thickeners, or other higher non-volatile additives are undesirable for use in such engines because of the tendency to leave a residue which accumulates and interferes with the operation of the engine. A synthetic lubricant of the type described in the present specification is especially adapted for use under such conditions, since the lubricant contains no additives and thus tends to leave no residue upon volatilization.

The new compound of the present invention, which has been found to be particularly suitable for use as a lubricating oil, is a complex ester prepared by first esterifying two hydroxyl groups of pentaglycerol with n-butyric acid and then fully esterifying adipic acid with this partial butyrate ester of pentaglycerol. The resulting complex ester has the following composition:

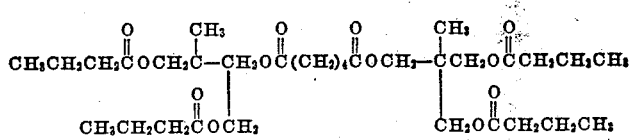

This ester possesses a very high viscosity, high viscosity index, and low pour point and appears to be unique in having all of these properties as compared with other similar esters. For example, a similar ester prepared by the use of caprylic acid instead of butyric acid in the partial esterification was found to possess a much lower viscosity index.

In the preparation of the above described complex ester, pentaglycerol was first formed by reacting propionaldehyde with formaldehyde and sodium hydroxide in accordance with the following equation:

$$CH_3CH_2CHO + 3HCHO + NaOH \longrightarrow$$

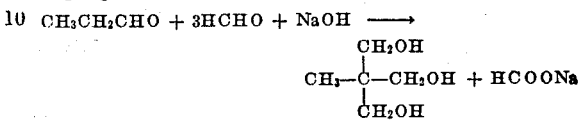

This compound is well known in the art. The pentaglycerol was then partially esterified with n-butyric acid by reacting two mols of the latter with one mol of the pentaglycerol under esterifying conditions, that is, in equipment which provides for the removal of water as it is formed. The resulting partial ester, containing a single hydroxyl group, was then reacted with adipic acid in the proportion of two mols of the partial ester for each mol of adipic acid, also under esterifying conditions. The two esterification steps are shown in the following equations:

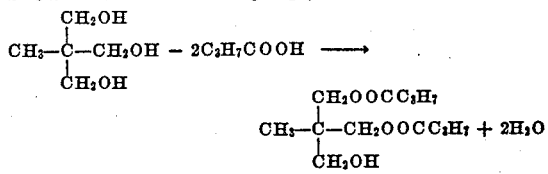

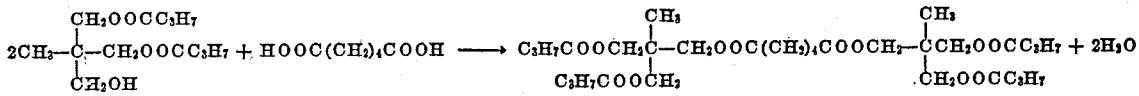

Details of preparing the pentaglycerol and the complex ester are given below.

Preparation of pentaglycerol 203 g. (3.5 mols) of propionaldehyde and 854 g. of 37% aqueous formaldehyde (formalin) solution (10.5 mols) were mixed and cooled to 5° C. 140 g. (3.5 mols) of flake sodium hydroxide was then added in small increments over a period of 40 minutes, the temperature being maintained at 15-20° C. When the addition of caustic was complete, the batch was stirred at 15-20° C. for one-half hour and the temperature then allowed to rise to 26° C. where it was maintained for 25 hours. After neutralization of the batch with carbon dioxide, the water was removed under vacuum and the resulting paste extracted with 800 cc. of ethanol. The sodium formate was filtered off and the ethanol solution evaporated. The residue was dissolved in 300 cc. of absolute ethanol, warmed, filtered and the filtrate allowed to crystallize in an ice bath. The product, after recrystallization from absolute ethanol, had a melting point of 110-145° C. and showed the following analysis:

|  | Found | Theory |
|---|---|---|
|  | Per cent | Per cent |
| Carbon | 49.95 | 50.0 |
| Hydrogen | 10.21 | 10.0 |
| Pentaglycerol content [1] | [2] 98.1 | 100.0 |

[1] Determined by hydrolyzing acetic anhydride with the product.
[2] Pure.

*Preparation of pentaglycerol butyrate-adipate mixed ester*

48 g. (0.4 mol) of pentaglycerol, 70.4 g. (0.8 mol) of n-butyric acid, 100 g. of toluene, and 0.7 g. of p-toluenesulfonic acid were placed in a glass reactor equipped with a reflux condenser and water trap. The batch was then heated under reflux for 53 hours and the water removed as formed. The contents of the reactor was then cooled, 29.2 g. (0.2 mol) of adipic acid and 0.2 g. of p-toluenesulfonic acid added, and the mixture heated under reflux for 16 hours, the by-product water again being removed as formed. The solution of the desired mixed ester in toluene was cooled, washed with a 5% aqueous sodium bicarbonate solution and subsequently with water. After water washing the toluene solution was heated to the boiling point to remove water, filtered, and the toluene removed from the filtrate by vacuum stripping to 35° C. at 5 mm. pressure. The mixed ester was found to possess the following properties:

| | |
|---|---|
| Pour point (ASTM), °F | -50 |
| Flash point, °F | 420 |
| Kinematic viscosity (centistokes at 100° F.) | 161.2 |
| Kinematic viscosity (centistokes at 210° F.) | 31.54 |
| Viscosity index (Dean and Davis) | 144 |

The above data indicate that the ester, constituting the subject matter of the present invention, possesses characteristics, particularly with regard to viscosity, viscosity index, and pour point, which indicate its suitability for general use as a lubricating oil and particularly for use where the utilization of additives is not desirable. The ester may also be blended with mineral lubricating oil to give lubricants of improved viscosity index and pour point.

What is claimed is:

1. The compound having the formula—

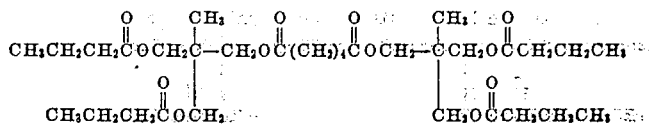

2. The process which comprises esterifying one molecular proportion of pentaglycerol with two molecular proportions of n-butyric acid to form a partial ester of pentaglycerol, and thereafter esterifying one molecular proportion of adipic acid with two molecular proportions of said partial ester of pentaglycerol.

ERVING ARUNDALE.
JOHN P. THORN.

No references cited.